US008373884B2

(12) United States Patent
Nakamura

(10) Patent No.: US 8,373,884 B2
(45) Date of Patent: Feb. 12, 2013

(54) IMAGE FORMING APPARATUS

(75) Inventor: Shoichi Nakamura, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 526 days.

(21) Appl. No.: 12/628,820

(22) Filed: Dec. 1, 2009

(65) Prior Publication Data

US 2010/0134838 A1 Jun. 3, 2010

(30) Foreign Application Priority Data

Dec. 2, 2008 (JP) ................................ 2008-307115

(51) Int. Cl.
*G06F 15/00* (2006.01)
*G03G 15/00* (2006.01)

(52) U.S. Cl. ........................................ 358/1.15; 399/81

(58) Field of Classification Search .................. 358/1.15
See application file for complete search history.

(56) References Cited

U.S. PATENT DOCUMENTS

2008/0231888 A1* 9/2008 Kuwano ....................... 358/1.15
2009/0027711 A1* 1/2009 Mizutani et al. ............. 358/1.13
2009/0059292 A1* 3/2009 Kuboki ........................ 358/1.15

FOREIGN PATENT DOCUMENTS

JP 2003-16056 1/2003
JP 2003-266899 9/2003
JP 2004-32704 1/2004
JP 2008-158709 7/2008

OTHER PUBLICATIONS

Notification of Reasons for Refusal mailed on Nov. 27, 2012, from the Japanese Patent Office in counterpart Japanese Patent Application No. 2008-307115 (2 pages).

* cited by examiner

*Primary Examiner* — Saeid Ebrahimi Dehkordy
(74) *Attorney, Agent, or Firm* — Finnegan, Henderson, Farabow, Garrett & Dunner, L.L.P.

(57) ABSTRACT

An image forming apparatus includes: a setting unit to set a printing condition of a job, the printing condition containing a condition indicating whether check print is to be executed or not; an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages.

6 Claims, 12 Drawing Sheets

FIG.3

| RAM ADDRESS | CONTENTS | | |
|---|---|---|---|
| xxxxx | PRINTING CONDITION INFORMATION 1 | | JOB 1 |
| | ⋮ | | |
| | IMAGE INFORMATION page 1 | | |
| | ⋮ | | |
| yyyyy | PRINTING CONDITION INFORMATION 1 (PRINT MODE: ONE-SIDE) | | JOB 2 |
| | PRINTING CONDITION INFORMATION 2 (OUTPUT TRAY: MAIN TRAY) | | |
| | PRINTING CONDITION INFORMATION 3 (PAPER FEED TRAY: PAPER FEED TRAY FT1) | | |
| | PRINTING CONDITION INFORMATION 4 (PAPER TYPE: PLAIN PAPER) | | |
| | PRINTING CONDITION INFORMATION 5 (INTER-SHEET EXISTS) | | |
| | FIRST INTER-SHEET SETTING | PAGES 3 TO 10 | |
| | | DOUBLE-SIDE PRINTING | |
| | | PAPER FEED TRAY FT2 | |
| | | HEAVY PAPER | |
| | SECOND INTER-SHEET SETTING | PAGE 15 | |
| | | ONE-SIDE PRINTING | |
| | | PAPER FEED TRAY FT3 | |
| | | PLAIN PAPER | |
| | ⋮ | | |
| | IMAGE INFORMATION page 1 (COMPRESSION MEMORY ADDRESS BBBB1-) | | |
| | IMAGE INFORMATION page 2 (COMPRESSION MEMORY ADDRESS DDDD1-) | | |
| | ⋮ | | |
| zzzzz | PRINTING CONDITION INFORMATION 1 | | JOB 3 |
| | ⋮ | | |
| | IMAGE INFORMATION page 1 | | |
| | ⋮ | | |

FIG.4

PAGE HEADER (AAAA1–AAAA5, …)

| COMPRESSION MEMORY ADDRESS | CONTENTS | COMPRESSION MEMORY ADDRESS | CONTENTS |
|---|---|---|---|
| AAAA1 | PAGE: PAGE 1 | EEEE1 | PAGE: PAGE 3 |
| AAAA2 | IMAGE SIZE: 1234×5278 | EEEE2 | IMAGE SIZE: 1234×5278 |
| AAAA3 | PRINT MODE: ONE-SIDE | EEEE3 | PRINT MODE: DOUBLE-SIDE |
| AAAA4 | PAPER FEED TRAY: PAPER FEED TRAY FT1 | EEEE4 | PAPER FEED TRAY: PAPER FEED TRAY FT2 |
| AAAA5 | PAPER TYPE: PLAIN PAPER | EEEE5 | PAPER TYPE: HEAVY PAPER |
| ⋮ | ⋮ | ⋮ | ⋮ |
| BBBB1 | IMAGE INFORMATION (PAGE 1) | FFFF1 | IMAGE INFORMATION (PAGE 3) |
| ⋮ | ⋮ | ⋮ | ⋮ |
| CCCC1 | PAGE: PAGE 2 | XXXX1 | PAGE: PAGE 15 |
| CCCC2 | IMAGE SIZE: 1234×5278 | XXXX2 | IMAGE SIZE: 1234×5278 |
| CCCC3 | PRINT MODE: ONE-SIDE | XXXX3 | PRINT MODE: ONE-SIDE |
| CCCC4 | PAPER FEED TRAY: PAPER FEED TRAY FT1 | XXXX4 | PAPER FEED TRAY: PAPER FEED TRAY FT3 |
| CCCC5 | PAPER TYPE: PLAIN PAPER | XXXX5 | PAPER TYPE: PLAIN PAPER |
| ⋮ | ⋮ | ⋮ | ⋮ |
| DDDD1 | IMAGE INFORMATION (PAGE 2) | YYYY1 | IMAGE INFORMATION (PAGE 15) |
| ⋮ | ⋮ | ⋮ | ⋮ |

NUMBER OF PAGES: 20 PAGES

| | |
|---|---|
| [OVERALL SETTING] | PAPER FEED TRAY FT1, PLAIN PAPER |
| [FIRST INTER-SHEET SETTING] | PAGES 3 TO 10, PAPER FEED TRAY FT2, HEAVY PAPER |
| [SECOND INTER-SHEET SETTING] | PAGE 15, PAPER FEED TRAY FT3, PLAIN PAPER |

*FIG. 7A*

DETERMINATION CONDITION: FIRST DETERMINATION CONDITION
TARGET PRINTING CONDITION: PAPER FEED TRAY
PAPER FEED TRAYS USED FOR JOB: PAPER FEED TRAY FT1, PAPER FEED TRAY FT2, PAPER FEED TRAY FT3

CHECK PRINT PAGE: PAGES 1 TO 15

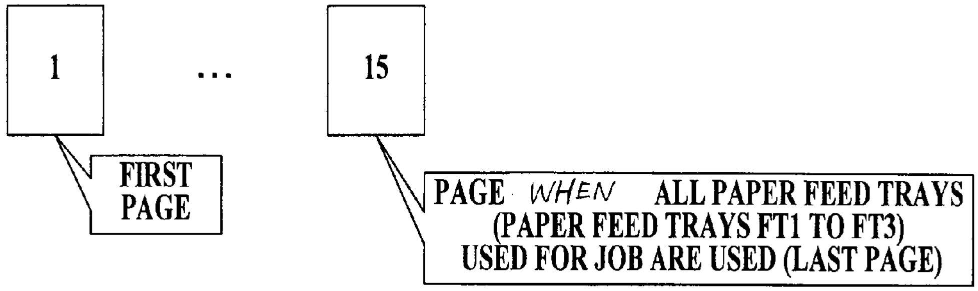

*FIG. 7B*

DETERMINATION CONDITION: SECOND DETERMINATION CONDITION
TARGET PRINTING CONDITION: PAPER TYPE
PAPER TYPE USED FOR JOB: PLAIN PAPER, HEAVY PAPER

CHECK PRINT PAGE: PAGES 1 TO 3

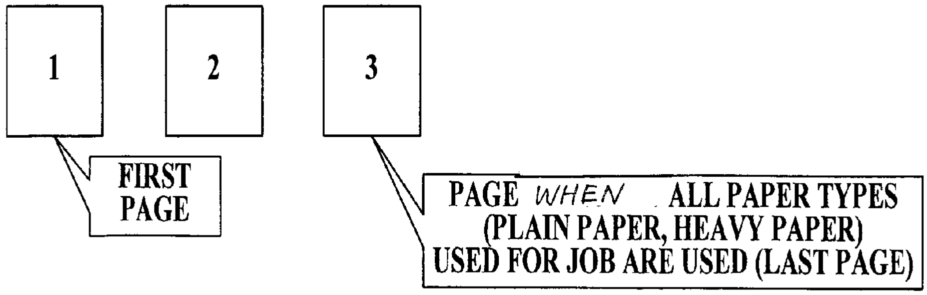

JOB CHAPTERED AT PAGE 1, PAGE 4 AND PAGE 7

DETERMINATION CONDITION: SIXTH DETERMINATION CONDITION

CHECK PRINT PAGE: PAGE 1, PAGE 4, PAGE 7

IMAGE FORMING APPARATUS

BACKGROUND OF THE INVENTION

1. Field of the Invention

The present invention relates to an image forming apparatus having a check printing function.

2. Description of Related Art

In an image forming apparatus having a check printing function, whether an image is formed in a desired finishing style can be checked before actually printing the image. In the conventional image forming apparatus, the image forming processing for check print is executed with respect to one copy of a document. Therefore, if one copy of a document has a large number of pages, the image forming processing is executed with respect to a large number of sheets regardless of user's wishes, which causes unnecessary operations if a user does not want to check all the pages.

Therefore, there is known an image forming apparatus in which a user indicates the number of sheets to be printed in advance before check print is executed and then the check print is executed on only the indicated number of sheets (see JP-A-2003-266899, for example).

Furthermore, there is also known an image forming apparatus provided with a double-side mode, a staple mode, a reduced-layout mode in addition to a manual setting mode of indicating the number of sheets for check print by a user. In this image forming apparatus, the number of sheets for check print is automatically calculated in accordance with each of the double-side printing mode, the staple mode and the reduced-layout mode, and the check print is executed on only the calculated number of sheets (see JP-A-2004-32704, for example).

However, with respect to JP-A-2003-266899, a user must set the number of sheets to be printed for check print. With respect to JP-A-2004-32704, a user is required to set the number of sheets to be printed in each of the double-side mode, the staple mode and the reduced-layout mode by himself or herself, which is cumbersome for the user.

In conventional image forming apparatuses containing the apparatuses disclosed in JP-A-2003-266899 and JP-A-2004-32704, it is merely possible to specify the number of sheets for check print, and it is impossible to specify the pages to be targeted for check print in accordance with the purpose of the check print.

As described above, with respect to the conventional image forming apparatuses, the operation load imposed on users is great, and also it is impossible to specify the pages for check print in accordance with the purpose, so that these image forming apparatuses are inconvenient to use for users.

SUMMARY OF THE INVENTION

According to one aspect of the present invention, there is provided an image forming apparatus, including: a setting unit to set a printing condition of a job, the printing condition containing a condition indicating whether check print is to be executed or not; an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 shows one example of job information;

FIG. 4 shows one example of data structure of image data;

FIG. 7A is an explanatory diagram showing check print pages according to the check print processing of the job shown in FIG. 6 when the first determination condition is set;

FIG. 7B is an explanatory diagram showing check print pages according to the check print processing of the job shown in FIG. 6 when the second determination condition is set;

DESCRIPTION OF THE PREFERRED EMBODIMENTS

Figure 1:
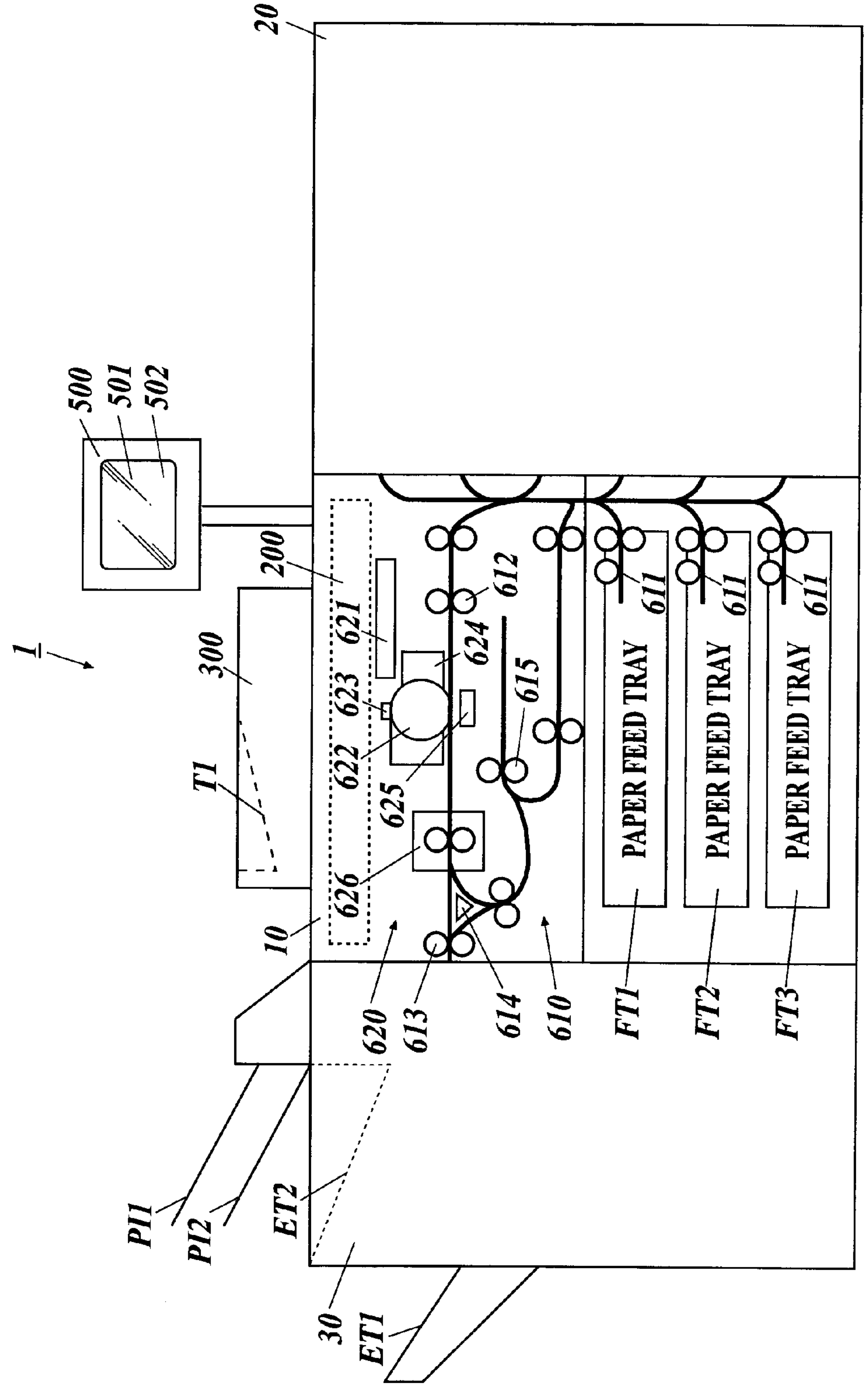
FIG. 1 is a front view showing a schematic configuration of an image forming apparatus according to a preferred embodiment of the present invention.

An image forming apparatus according to a preferred embodiment of the present invention will be described below with reference to the accompanying drawings. However, the scope of this invention is not limited to the embodiment shown in the drawings.

FIG. 1 is a front view showing a schematic configuration of an image forming apparatus 1 according to an embodiment of the present invention.

As shown in FIG. 1, the image forming apparatus 1 of this embodiment is a so-called multifunction device having a scanner function, a copy function and a printer function. The image forming apparatus 1 includes a main body unit 10, and a large-capacity tray unit 20 and a post-processing unit 30 which are optionally connected to the main body unit 10.

The main body unit 10 has a scanner unit 200, an automatic document feeding unit (ADF: Automatic Document Feeder) 300, an operation display unit 500, an image forming unit 600 and paper feed trays FT1 to FT3.

The large-capacity tray unit 20 has plural paper feed trays (not shown), for example, and feeds sheets to the main body unit 10.

The post-processing unit 30 is a so-called a finisher for executing various kinds of post-processing on sheets fed from the main body unit 10, and has a sort unit for executing sort processing on the sheets fed from the main body unit 10, a punch unit for executing punch processing on the sheets, a folding unit for executing folding processing on the sheets, a cutting unit for executing cutting processing on the sheets, etc. Output trays (main tray ET1, sub tray ET2) for outputting the fed sheets are provided at the left side of the post-processing unit 30.

Two post inserter upper and lower stands P11 and P12 serving as trays for inserted sheets are provided at the upper portion of the post-processing unit 30, and various kinds of sheets are stacked and supplied in conformity with user's need.

For example, a tab sheet having a projecting tab portion formed at a part of a sheet piece, a color sheet having a different color, a sheet having an image formed thereon (hereinafter referred to as "tab sheet or the like") is placed on one of the post inserters P11 and P12, and fed according to the printing condition of the job, whereby these sheets can be inserted between plural sheets for print fed from the main body unit 10.

In the image forming apparatus, a document placed on a document tray T1 of the ADF unit 300 is fed to a contact glass as a reading place of the scanner unit 200, and an image of the document is read out by an optical system of the scanner unit 200. Here, the image is not limited to image data such as a figure, a photograph or the like, and it contains text data such as characters, symbols or the like.

The image (analog image signal) read out by the scanner unit 200 is output to a state managing unit 100 described later, subjected to A/D conversion in the state managing unit 100, subjected to various kinds of image processing and then output to an image forming unit 600. In the image forming unit 600, an image based on the digital image data is formed on a sheet which is fed from any paper feed tray FT provided to the main body portion 10 or the large-capacity tray unit 20.

The image-formed sheet is fed to the post-processing unit 30 by a sheet feeder 610 in the image forming unit 600, subjected to predetermined post-processing by a post-processing mechanism of the post-processing unit 30, and then output to one of the output trays ET1 and ET2.

The styles of the paper feed trays FT and the output trays ET are not limited to those of FIG. 1, and the numbers thereof are not limited to those of FIG. 1.

Here, the image forming apparatus 1 has a check print function to execute image forming processing for check print. The image forming processing for check print means image forming processing for image check which is executed before the image forming processing for actual print is executed. When the printing condition of a job contains execution of check print, this processing is executed on the basis of the printing condition of the job by the image forming unit 600. A user can watch an image on a sheet output through the image forming processing for check print to determine whether the image is formed in a desired finishing style before the image forming processing for actual print is executed.

As described later, the image forming processing for check print is executed on only pages which are determined to be subjected to check print on the basis of the printing condition of a job and a predetermined determination condition.

The job means a series of operations concerning image formation. For example, when image formation is executed on documents of plural sheets, a series of operations concerning image formation of the documents of the plural sheets correspond to one job. Furthermore, when image formation of plural copies is executed, a series of operations concerning image formation of the plural copies correspond to one job.

Figure 2:
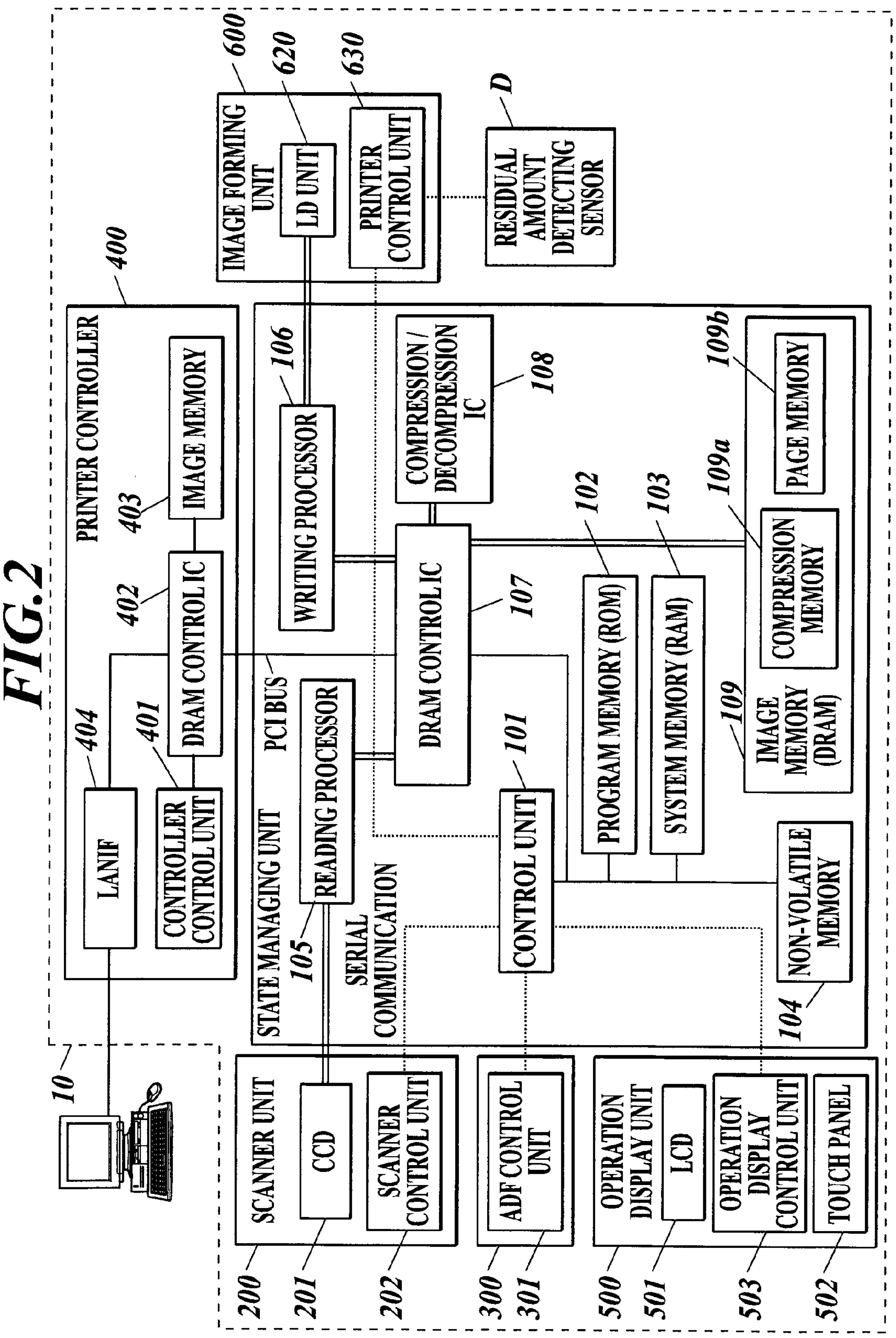
FIG. 2 is a block diagram showing a functional configuration of the image forming apparatus.

FIG. 2 is a block diagram showing a functional configuration of the image forming apparatus 1.

The main body unit 10 has the state managing unit 100, the scanner unit 200, the ADF unit 300, the printer controller 400, the operation display unit 500, the image forming unit 600, the paper feed trays FT1 to FT3 and a residual amount detecting sensor D.

The state managing unit 100 has a control unit 101, a program memory (ROM: Read Only Memory) 102, a system memory (RAM: Random Access Memory) 103, a non-volatile memory 104, a reading processor 105, a writing processor 106, a DRAM (Dynamic Random Access Memory) control IC 107, a compression/decompression IC 108 and an image memory 109, for example.

The control unit 101 includes CPU (Central Processing Unit). The control unit 101 reads out various kinds of processing programs such as a system program, an image forming processing program, and a post-processing program which are stored in ROM 102, loads the programs into RAM 103 and controls the operation of each part of the image forming apparatus according to the programs.

For example, the control unit 101 stores the printing condition of each job set in the operation display unit 500 at a predetermined area of RAM 103, and executes the image forming processing corresponding to the job on the basis of the stored printing condition.

When the printing condition set in the operation display unit 500 contains execution of check print, the control unit 101 determines pages to be subjected to check print on the basis of the printing condition and the determination condition preset in the operation display unit 500, and then executes the image forming processing for check print on only the determined target pages.

ROM 102 includes a non-volatile memory such as a semiconductor. ROM 102 stores various kinds of processing programs such as the system program corresponding to the image forming apparatus 1, the image forming processing executable on the system program, and the post-processing program. These programs are stored in a computer-readable program code format, and the control unit 101 executes the operation based on the program code.

RAM 103 forms a working area in which the various kinds of programs executed by the control unit 101 and data relating to these programs are temporarily stored, and stores set information of the job under execution, etc.

The non-volatile memory 104 stores various kinds of set data relating to the image forming apparatus 1.

The reading processor 105 subjects the analog image signal input from the scanner unit 200 to various kinds of processing such as analog signal processing, A/D conversion processing, shading processing, etc. to generate digital image data, and then outputs the digital image data to the DRAM control IC 107.

The writing processor 106 generates a PWM (Pulse Width Modulation) signal based on image data input from the compression/decompression IC 108, and outputs the PWM signal to the image forming unit 600.

The DRAM control IC 107 controls the compression/decompression processing of the compression/decompression IC 108 under the control of the control unit 101, and also controls the input/output of image data in the image memory 109.

Specifically, the DRAM control IC 107 controls the compression/decompression IC 108 to compress the digital image data input from the reading processor 105 or the image data input from the printer controller 400, and then writes and temporarily stores the compressed image data into a compression memory 109*a* of the image memory 109. Furthermore, the DRAM control IC 107 controls the compression/decompression IC 108 to decompress the image data stored in the image memory 109, and then outputs the decompressed image data to the writing processor 106. At this time, when a control signal instructing to execute composition processing is output from the control unit 101, the DRAM control IC 107 controls the compression/decompression IC 108 to decompress the image data, overwrites the inherent image data in the non-volatile memory 104, and then outputs the image data to the writing processor 106.

Furthermore, the DRAM control IC 107 outputs control data input from the printer controller 400 to the control unit 101.

The compression/decompression IC 108 executes compression processing and expansion processing on the image data under the control of the DRAM control IC 107.

The image memory 109 has the compression memory 109*a* and a page memory 109*b*, each of which is DRAM, for example. The compression memory 109*a* temporarily stores a job file compressed by the compression/decompression IC 108 according to a control signal input from the DRAM control IC 107, for example. The page memory 109*b* temporarily stores a non-compressed job file as a print output target before print output, for example.

The scanner 200 has an image sensor such as CCD 201 or the like and a scanner control unit 202. The scanner control unit 202 controls the driving of each part of the scanner unit 200 on the basis of a control signal from the control unit 101. Specifically, the scanner control unit 202 executes exposure scan on the surface of a document placed on the contact glass, and images reflection light from the document onto CCD 201 to read the image of the document. A thus-imaged optical signal is photoelectrically converted to generate an analog image signal, and the generated analog image signal is output to the reading processor 105.

The ADF unit 300 has an ADF control unit 301 for controlling the ADF unit 300 on the basis of a control signal from the control unit 101, and automatically feeds documents placed on the document tray T1 onto the contact glass of the scanner unit 200 one by one.

The printer controller 400 manages and controls image data and jobs input from an external device connected to a network into the image forming apparatus 1 when the image forming apparatus 1 is used as a network printer. The printer controller 400 includes a controller control unit 401, a DRAM control IC 402, an image memory 403, and LANIF 404.

The controller control unit 401 collectively controls the operation of each part of the printer controller 400.

The DRAM controller IC 402 controls storage of data received by LANIF 404 into the image memory 403 and reading of data from the image memory 403 according to an instruction from the controller control unit 401. Furthermore, the DRAM control IC 402 is connected to the DRAM control IC 107 of the control unit 101 through a PCI (Peripheral Components Interconnect) bus, and it reads out data as a print target from the image memory 403 according to an instruction from the controller control unit 401 and outputs the data to the DRAM control IC 107.

The image memory 403 includes DRAM, for example, and temporarily stores input data.

LANIF 404 is a communication interface such as NIC (Network Interface Card), a modem or the like, for example, and it receives data containing the printing condition of a job, print data, etc. from an external device which is connected to a communication network N such as LAN or the like. The data received from the external device is output to the DRAM control IC 402.

An operation display unit 500 has a display unit 501, a touch panel 501 which is integrally provided to the display unit 501, an operation display control unit 503 and a group of other operation keys (not shown).

The display unit 501 includes LCD (Liquid Crystal Display), for example. The display unit 501 displays a printing condition setting frame for setting the printing condition of a job, a determination condition setting frame for setting a determination condition to determine pages to be subjected to check print, other kinds of setting frames, an image state, an operating condition of each function, etc. according to a display control signal from the operation display control unit 503.

A pressure-sensitive type (resistance film pressure type) touch panel 502 in which transparent electrodes are arranged in a lattice-like pattern is provided on the screen of the display unit 501. An XY coordinate of a power point which is operated by a finger, a touch pen or the like is detected on the basis of a voltage value, and a detected position signal is output as an operation signal to the operation display control unit 503.

The operation display control unit 503 executes the display control in the display unit 501 on the basis of a control signal from the control unit 101. Furthermore, the operation display control unit 503 controls to output an operation signal input from the touch panel 502 on the display unit 501 or the operation key group to the control unit 101.

Specifically, the operation display unit 500 is operated as a setting unit when a user sets the printing condition of a job.

The printing condition is a condition for forming an image on a sheet, and it is set for each of jobs. The printing condition contains execution or non-execution of check print, a condition concerning a paper feed tray to be used, a condition concerning the paper type of a sheet being used, a condition concerning the presence or absence of the programming job mode, and a condition concerning the presence or absence of the chapter division mode. In addition, the size of a sheet being used in the image forming processing, the density of an image, a reduction ratio, print surface (double-side printing/one-side printing), a output tray or the like can be indicated as the printing condition.

These printing conditions are set by user's operation of the touch panel 502 on the printing condition setting frame displayed on the display unit 501, and stored as a part of job information in RAM 103. The image forming processing is executed by the image forming unit 600 on the basis of the printing condition stored in RAM 103.

For example, when the job printing condition contains a printing condition of check print, the image forming processing for check print is executed by the image forming unit 600 before the image forming processing for actual print is executed. At this time, the control unit 101 determines pages to be subjected to check print on the basis of the job printing condition and the preset determination condition, and executes the image forming processing for check print on only pages which are targeted to be subjected to check print.

FIG. 3 shows one example of the job information. As shown in FIG. 3, the job information is stored in the working area of RAM 103 every job. For example, the job information of a job 1 is stored in the working area of RAM address "xxxxx", the job information of a job 2 is stored in a working area of RAM address "yyyyy", and the job information of a job 3 is stored in a working area of RAM address "zzzzz".

The job information of each job includes printing condition information and image information. The printing condition information is information representing the printing condition set on the printing condition setting frame, and the image information is information of an image to be formed on a sheet.

The printing condition information contains print mode information, sheet output information, paper feed tray information, paper type information and inter-sheet information.

The print mode information is printing condition information for setting the print face (double-side or one-side) of the sheet. For example, one-side is set as the print face in the job 2 of FIG. 3.

The sheet output information is printing condition information for setting an output tray used in the job. For example, the main tray ET1 is set as the output tray in the job 2 of FIG. 3.

The paper feed tray information is printing condition information for setting the paper feed tray used in the job. For example, the paper feed tray FT1 is set as the paper feed tray in the job 2 of FIG. 3.

The paper type information is printing condition information for setting the paper type of a sheet used in the job (for example, plain paper, good quality paper, heavy paper or the like). For example, plain paper is set as the paper type of a sheet to be used in the job 2 of FIG. 3.

The inter-sheet information is printing condition information concerning various kind of setting concerning inter-sheet. For example, two inter-sheet settings are executed in the job 2 of FIG. 3. The first inter-sheet setting corresponds to information for setting pages 3 to 10 as insertion pages, double-side printing as the print mode, the paper feed tray FT2 as the paper feed tray to be used, and the heavy paper as the paper type of a sheet to be used. The second inter-sheet setting corresponds to information for setting 15th page as the insertion page, the one-side printing as the print mode, the paper feed tray FT3 as the paper feed tray to be used and the plain paper as the paper type of a sheet to be used.

The addresses of the compression memory 109*a* having the image data of the respective pages are stored in the image data in the job information. FIG. 4 shows one example of data structure of the image data. As shown in FIG. 4, the image data includes a page header and image information for each page, and the image data is stored in the compression memory 109*a*. For example, the page header of page 1 is stored in an area having a compression memory address "AAAA1" as a head address, and the image information of page 1 is stored in an area having a compression memory address "BBBB1" as a head address.

The page header includes page information for setting the number of the page, image size information for setting the image size, print mode information for setting the sheet print face (double-side/one-side), paper feed tray information for setting the paper feed tray to be used, paper type information for setting the paper type of a sheet to be used, etc. For example, in the page header of page 1 shown in FIG. 3, page 1 is set as the page information, 1234×5278 is set as the image size information, one-side printing is set as the print mode information, the paper feed tray FT1 is set as the paper feed tray information, and plain paper is set as the paper type information.

As shown in FIG. 3, if inter-sheet setting is contained in the printing condition information of the job information, the inter-sheet setting is reflected to the image data in the compression memory 109*a*. Specifically, as shown in FIG. 3, the first inter-sheet setting in FIG. 3 is reflected to the image data from pages 3 to 10, and the second inter-sheet setting in FIG. 3 is reflected to the image data of page 15.

The operation display unit 500 is operated when a user sets a determination condition for determining pages to be subjected to check print (i.e., check print pages).

The determination condition is a condition for determining the pages to be subjected to check print. In this embodiment, the user can pre-select the presence or absence of setting for each of the following six determination conditions on the determination condition setting frame (not shown). The control unit 101 determines pages to be subjected to check print on the basis of the printing condition and the set determination condition for a job as a check print target.

A first determination condition is defined as follows. If the printing condition of a job as a check print target indicates that a plurality of paper feed trays to be used are set, the first determination condition indicates that page 1 is set as a first page, a page when all the paper feed trays contained in the printing condition are used is set as a last page, and all the pages from the first page to the last page are determined to be subjected to the check print (check print pages).

A second determination condition is defined as follows. If a plurality of paper types to be used are set in the printing condition of a job as a check print target, the second determination condition indicates that page 1 is set as a first page, a page when all the paper types contained in the printing condition are used is set as a last page, and all the pages from the first page to the last page are determined to be subjected to the check print.

A third determination condition is defined as follows. If a plurality of paper feed trays to be used are set in the printing condition of a job as a check print target, the third determination condition indicates that a first page in each of the paper feed trays is determined to be subjected to the check print.

A fourth determination condition is defined as follows. If a plurality of paper types to be used are set in the printing condition of a job as a check print target, the fourth determination condition indicates that a first page in each of the paper types is determined to be subjected to the check print.

A fifth determination condition is defined as follows. If a programming job mode is set in the printing condition of a job as a check print target, the fifth determination condition indicates that a first page of each of the combined jobs is determined to be subjected to the check print.

A sixth determination condition is defined as follows. If a chapter division mode is set in the printing condition of a job as a check print gadget, the sixth determination condition indicates that a first page of each chapter is determined to be subjected to the check print.

A specific method of determining pages to be subjected to check print on the basis of each of the first to sixth determination conditions will be described later.

A user specifies on the determination condition setting frame whether each of the first to sixth conditions is set or not. The information concerning the presence or absence of the setting of each determination condition specified on the determination condition setting frame is stored in the non-volatile memory 104, and read out when check print pages are determined.

The first determination condition and the third determination condition cannot be simultaneously set to one job, and if one of the determination conditions is set to some job, the other determination condition cannot be set. Furthermore, the second determination condition and the fourth determination condition cannot be simultaneously set to one job, and if one of the determination conditions is set to some job, the other determination condition cannot be set.

The image forming unit 600 includes a feeding unit 610, an LD (Laser Diode) unit 620 and a printer control unit 630, and forms an image on a sheet on the basis of image data input from the writing processor 106.

For example, the feeding unit 610 has various kinds of rollers containing a sheet feeding roller 611, a resist roller 612 and a sheet ejection roller 613 that feed a sheet along a sheet feeding passage in the LD unit 620, a sheet feed passage switching plate 614, a reversing unit 615, etc. The sheet feeding unit 610 supplies a sheet from the paper feed tray set in the printing condition of the job and feeds the supplied sheet along the sheet feeding passage under the control of the printer control unit 630.

Plural sensors (not shown) are provided on the sheet feeding passage of the LD unit 620. Each of these sensors generates a detection signal when a sheet passes over each sensor, and outputs the detection signal to the printer control unit 630.

The LD unit 620 has LD 621, a photosensitive drum 622, an electrifying unit 623, a developing unit 624, a transfer unit 625, a fixing unit 626, etc.

On the basis of an instruction from the printer control unit 630, the LD unit 620 makes the electrifying unit 623 electrify the surface of the photosensitive drum 622 of the LD unit 620, and makes LD 621 irradiate the surface of the photosensitive drum 622 with a laser beam on the basis of a PWM signal input from the writing processor 106 to form an electrostatic latent image. Then, toner is attached to an area containing the electrostatic latent image on the surface of the photosensitive drum 622 in the developing unit 624, and the toner on the surface of the photosensitive drum 622 is transferred to a sheet by the transfer unit 625 to form an image. Furthermore, the transferred image is fixed in the fixing unit 626, and then the image-formed sheet is fed to the post-processor 30 by the sheet ejection roller 613.

The printer control unit 630 receives a control signal from the control unit 101, and controls the operation of each part of the LD unit 620. Furthermore, the printer control unit 630 counts the number of fed sheets on the basis of the detection signals from the sensors provided on the sheet feeding passage, and outputs the count result to the control unit 101.

The printer control unit 630 counts a sensor signal output from a sensor (not shown) provided in the neighborhood of the sheet feed roller 611 during execution of each job to count the number of fed sheets, and outputs the count result to the control unit 101.

Figure 5:
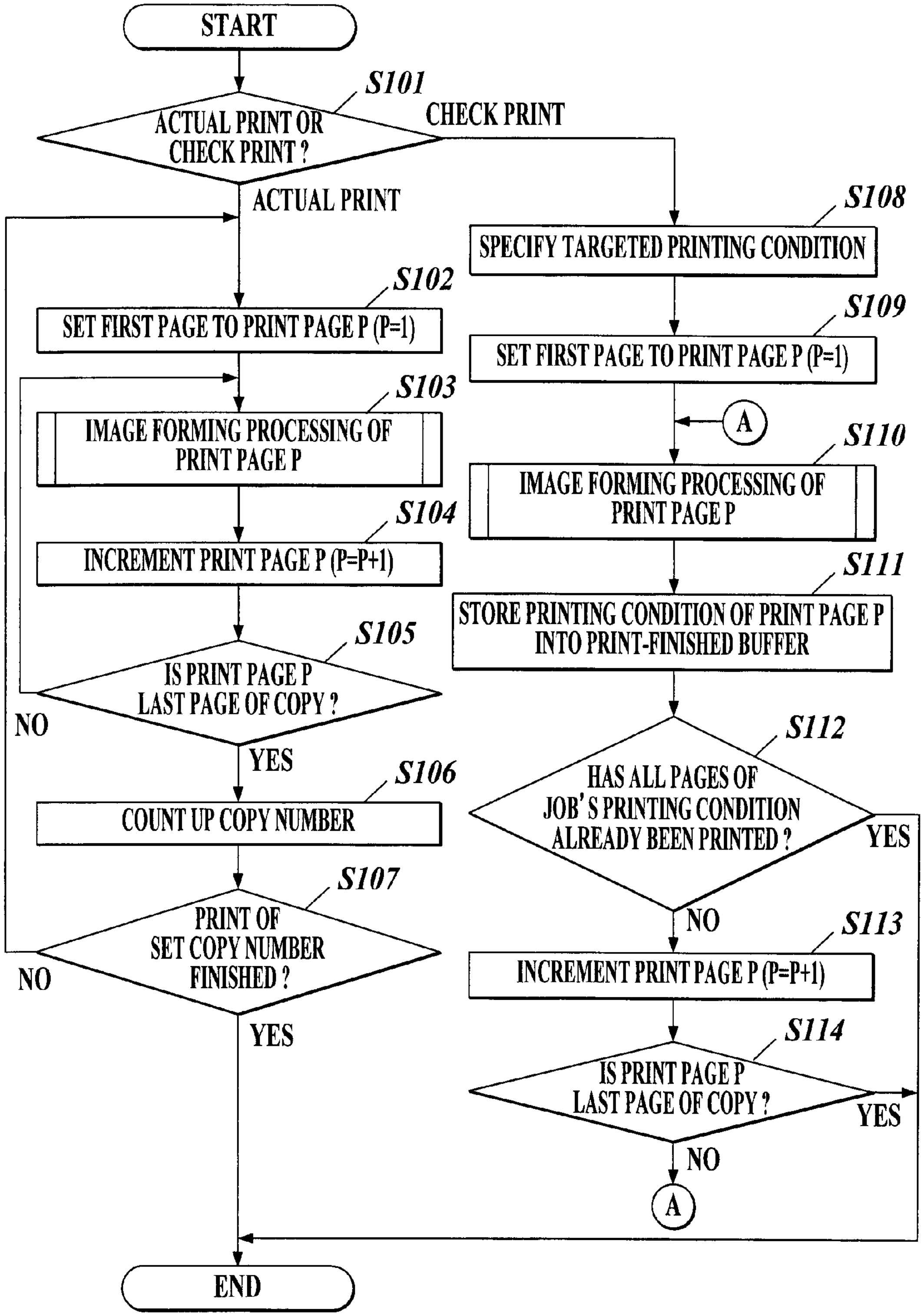
FIG. 5 shows a flowchart of check print processing executed when a first determination condition or a second determination condition is set.

Next, check print processing executed when the first determination condition or the second determination condition is set will be described with reference to the flowchart of FIG. 5.

In step S101, the control unit 101 determines on the basis of the job printing condition which one of actual print and check print the print mode corresponds to. If it is determined that the print mode corresponds to the actual print, the control unit 101 goes to step S102. On the other hand, if it is determined that the print mode corresponds to the check print, the control unit 101 goes to step S108.

In step S102, the control unit 101 sets the first page of a copy to the print page P (P=1).

In step S103, the control unit 101 makes the image forming unit 600 execute the image forming processing on the print page P.

In step S104, the control unit 101 increments the print page P (P=P+1).

In step S105, the control unit 101 determines whether the print page P is the last page of the copy. If it is determined that the print page P is the last page of the set (step S105: Yes), the control unit 101 goes to step S106. On the other hand, when the print page is not the last page of the set (step S105: NO), the control unit 101 returns to step S103.

In step S106, the control unit 101 counts up the copy number.

In step S107, the control unit 101 determines whether the image forming processing of the set copy number is finished or not. If it is determined that the output of the set copy number is finished (step S107: YES), the control unit 101 finishes this processing. On the other hand, if it is determined that the output of the set copy number is not finished (step S107: NO), the control unit 101 increments the copy number and then returns to step S102.

In step S108, the control unit 101 specifies the printing condition as a target on the basis of the set determination condition. Specifically, when the first determination condition is set, the control unit 101 specifies "paper feed tray" as a target printing condition, and specifies all the paper feed trays to be used in a job. When the second determination condition is set, the control unit 101 specifies "paper type" as a target printing condition, and specifies all the paper types to be used in the job.

In step S109, the control unit 101 sets the first page of a copy to the print page P (P=1).

In step S110, the control unit 101 makes the image forming unit 600 execute the image forming processing on the print page P.

In step S111, the control unit 101 stores the printing condition of the print page P into a print-finished buffer. At this time when the first determination condition is set, the control unit 101 stores the paper feed tray set in the printing condition of the print page P into the print-finished buffer. Furthermore, when the second determination condition is set, the control unit 101 stores the paper type set in the printing condition of the print page P into the print-finished buffer.

In step S112, the control unit 101 compares the job printing condition (the paper feed tray or the paper type) with the print-finished buffer, and determines whether all the pages of the job printing condition have been output (printed). Specifically, when the first determination condition is set, the control unit 101 compares the all the paper feed trays to be used in the job with the paper feed trays stored in the print-finished buffer, and determines whether all the paper feed trays to be used in the job are coincident with the paper feed trays in the print-finished buffer. When the second determination condition is set, the control unit 101 compares all the paper types to be used in the job with the paper types stored in the print-finished buffer, and determines whether all the paper types to be used in the job are coincident with the paper types in the print-finished buffer. In step S112, the control unit 101 determines that all the pages of the job printing condition have not been printed (step S112: NO), the control unit 101 goes to step S113. On the other hand, if it is determined that all the pages of the job printing condition have been printed (step S112: YES), the control unit 101 sets the print page P as the last page and finishes this processing.

In step S113, the control unit 101 increments the print page P (P=P+1).

In step S114, the control unit 101 determines whether the print page P is the last page of a copy. If it is determined that the print page P is the last page of the copy (step S114: YES), the control unit 101 finishes this processing. On the other hand, if it is determined that the print page P is not the last page of the copy (step S114: NO), the control unit 101 returns to step S110.

Here, a specific example of determining check print pages when the first determination condition is set will be described. The check print pages are determined on the basis of the first determination condition and the printing condition of a job as a check print target by the control unit 101. Suppose that the check print is executed with respect to the job shown in FIG. 6.

Figure 6:
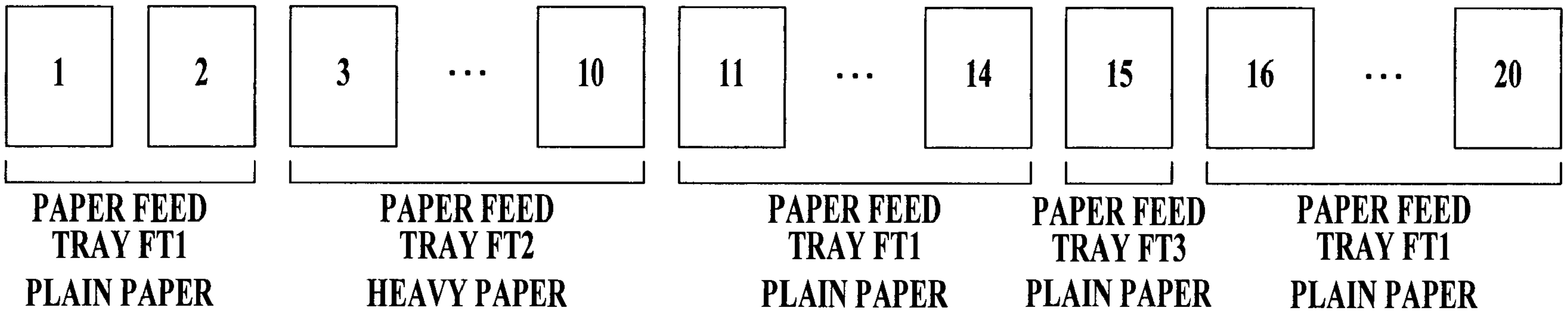
FIG. 6 shows a diagram for explaining a job as a target of the check print processing.

As shown in FIG. 6, in this job, two inter-sheet settings are contained in addition to the overall setting. Furthermore, the page number of the job is set to "20 pages", and "paper feed tray FT1" and "plain paper" are set as the paper feed tray to be used and as the paper type to be used in the overall setting. Furthermore, in the first inter-sheet setting, "pages 3 to 10" are set as the insertion pages, "paper feed tray FT2" is set as the paper feed tray to be used, and "heavy paper" is used as the paper type of sheets to be used. In the second inter-sheet setting, "page 15" is set as the insertion page, "paper feed tray FT3" is set as the paper feed tray to be used, and "plain paper" is used as the paper type of sheets to be used.

First, when specifying "paper feed tray" as target printing condition according to the setting of the first determination condition, the control unit 101 specifies a paper feed tray which is scheduled to be used (hereinafter referred to as "use-scheduled paper feed tray") in a job, on the basis of the paper feed tray information (see FIG. 3) contained in the printing condition information of the job. Accordingly, the three paper feed trays of "paper feed tray FT1, paper feed tray FT2, paper feed tray FT3" are specified as the use-scheduled paper feed trays.

When the paper feed trays which are scheduled to be used in the job are specified, the control unit 101 determines page 1 of the job as a first page. Then, the control unit 101 makes the image forming unit 600 execute the image forming processing for check print with the to page set as a target page, and also stores, into the print-finished buffer, the information for identifying the paper feed tray used in the image forming processing of the target page. That is, the paper feed trays which have been already used are stored in the print-finished buffer.

Subsequently, the control unit 101 compares the use-scheduled paper feed trays FT1 to FT3 with the used paper feed trays stored in the print-finished buffer, and determines whether all the use-scheduled paper feed trays FT1 to FT3 have been used. If it is determined that the use-scheduled paper feed trays FT1 to FT3 contain a non-used paper feed tray FT, the control unit 101 repeats the above processing (the image forming processing of the target page and the determination as to whether all the use-scheduled paper feed trays have been used or not) with the next page set as the target page until all the use-scheduled paper feed trays FT1 to FT3 have been used.

If it is determined that all the paper feed trays FT1 to FT3 which are scheduled to be used have been used, the control unit 101 determines the target page at that time point as the last page, and finishes the check print.

In the job of FIG. 6, the paper feed tray FT1 is used for page 1, page 2, pages 11 to 14 and pages 16 to 20; the paper feed tray FT2 is used for pages 3 to 10 which are inserted on the basis of the first inter-sheet setting; and the paper feed tray FT3 is used for page 15 which is inserted on the basis of the second inter-sheet setting. That is, the very first page when all the paper feed trays (the paper feed tray FT1, the paper feed tray FT2, the paper feed tray FT3) are used is page 15.

That is, in this job, page 1 is determined as a first page. The image forming processing is successively executed from the first page, and when the image forming processing of page 15 is finished, it is determined that all the paper feed trays FT1 to FT3 have been used, and page 15 is set as a last page. Accordingly, in the job of FIG. 6, pages 1 to 15 are subjected to check print as shown in FIG. 7A.

Next, a specific example of determining check print pages with respect to the job shown in FIG. 6 when the second determination condition is set will be described. The check print pages are determined on the basis of the printing condition of the job as a check print target and the second determination condition by the control unit 101.

First, when specifying "paper type" as a printing condition in accordance with the setting of the second determination condition, the control unit 101 specifies the paper type to be used in a job on the basis of the paper type information (see FIG. 3) contained in the printing condition information of the job. Accordingly, the two paper types of "plain paper, heavy paper) are specifies as the use-scheduled paper type.

When the paper type scheduled to be used in the job is specified, the control unit 101 determines page 1 of the job as a first page. The control unit 101 causes the image forming unit 600 to execute the image forming processing for check print with the first page as the target page, and stores the information for identifying the paper type used in the image forming processing of the target page into the print-finished buffer. That is, the information on paper types which have been already used is stored in the print-finished buffer.

Subsequently, the control unit 101 compares the use-scheduled paper types "plain paper, heavy paper" with the used paper type stored in the print-finished buffer, and determines whether all the use-scheduled paper types "plain paper, heavy paper" have been used. If it is determined that a non-used paper type is contained in the use-scheduled paper types "plain paper, heavy paper", the control unit 101 sets the next page to the target page and repeats the above processing (the image forming processing of the target page and the determination as to whether all the use-scheduled paper types have been used) until all the use-scheduled paper types "plain paper, heavy paper" are used.

If it is determined that all the use-scheduled paper types "plain paper, heavy paper" have been used, the control unit 101 determines the target page as the last page at that time point, and finishes the check print.

In the job of FIG. 6, plain paper is used for page 1, page 2, pages 11 to 14, pages 16 to 20, and page 15 which is inserted on the basis of the second inter-sheet setting; and heavy paper is used for pages 3 to 10 which are inserted on the basis of the first inter-sheet setting. That is, the very first page when all the paper types (plain paper and heavy paper) are used for the job is page 3.

That is, in this job, page 1 is determined as a first page. The image forming processing is successively executed from the first page, and when the image forming processing on page 3 is finished, it is determined that all the scheduled paper types "plain paper, heavy paper" have been used, and page 3 is set as a last page. Accordingly, in the job of FIG. 6, pages 1 to 3 are subjected to check print as shown in FIG. 7B.

Figure 8:
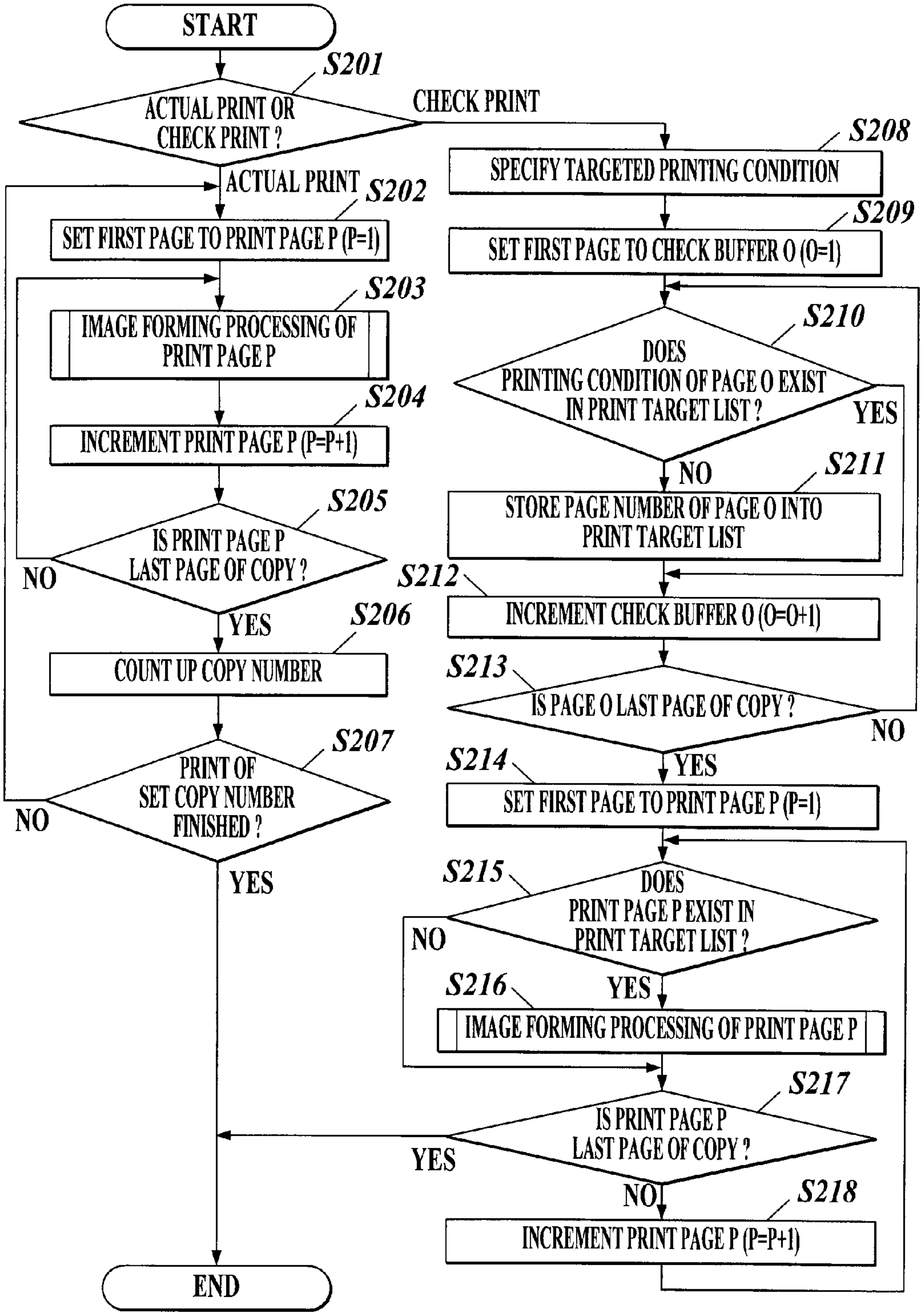
FIG. 8 shows a flowchart of check print processing executed when a third determination condition or a fourth determination condition is set.

Next, check print processing executed when the third determination condition or the fourth determination condition is set will be described with reference to the flowchart of FIG. 8.

In step S201, the control unit 101 determines on the basis of the printing condition of the job which one of the actual print mode and the check print mode the print mode corresponds to. If it is determined that the print mode corresponds to the actual print mode, the control unit 101 goes to step S202. On the other hand, if it is determined that the print mode corresponds to the check print mode, the control unit 101 goes to step S208.

In step S202, the control unit 101 sets the first page of a copy to the print page P (P=1).

In step S203, the control unit 101 makes the image forming unit 600 execute the image forming processing of the print page P.

In step S204, the control unit 101 increments the print page P (P=P+1).

In step S205, the control unit 101 determines whether the print page P is the last page of the copy. If it is determined that the print page P is the last page of the copy (step S205: YES), the control unit 101 goes to step S206. On the other hand, if it is determined that the print page P is not the last page of the copy (step S205: NO), the control unit 101 returns to step S203.

In step S206, the control unit 101 counts up the copy number.

In step S207, the control unit 101 determines whether the image forming processing of the set copy number is finished. If it is determined that the print of the set copy number is finished (step S207: YES), this processing is finished. On the other hand, when the print of the set copy number is not finished (step S207: NO), the control unit 101 increments the copy number, and then returns to step S202.

In step S208, the control unit 101 specifies the printing condition as a target on the basis of the set determination condition. Specifically, when the third determination condition is set, the control unit 101 specifies "sheet supply tray" as a target printing condition, and when the fourth determination condition is set, the control unit 101 specifies "paper type" as a target printing condition.

In step S209, the control unit 101 sets the first page to a check buffer O (O=1).

In step S210, the control unit 101 determines whether the printing condition (sheet supply tray or paper type) of the page O stored in the check buffer exists in a print target list. If it is determined that the printing condition of the page O does not exist in the print target list (step S210: NO), the control unit 101 shits the processing to step S211. On the other hand, if it is determined that the printing condition of the page O exists in the print target list (step S210: YES), the control unit 101 goes to step S212.

In step S211, the control unit 101 stores the page number of the page O into the print target list.

In step S212, the control unit 101 increments the check buffer O (O=O+1).

In step S213, the control unit 101 determines whether the page O is the last page of a copy. If it is determined that the page O is not the last page of a copy (step S213: NO), the control unit 101 goes to step S210. On the other hand, if it is determined that the page O is the last page of a copy (step S213: YES), the control unit 101 goes to step S214.

Here, through the processing of the steps S208 to S213, the first pages of all the printing conditions (paper feed tray or paper type) contained in the job are stored in the print target tray.

In step S214, the control unit 101 sets the first page of a copy to the print page P (P=1).

In step S215, the control unit 101 determines whether the print page P exists in the print target list. If it is determined that the print page P exists in the print target list (step S215: YES), the control unit 101 goes to step S216. On the other hand, if it is determined that the print page P does not exist in the print target list (step S215: NO), the control unit 101 goes to step S217.

In step S216, the control unit 101 makes the image forming unit 600 execute the image forming processing of the print page P.

In step S217, the control unit 101 determines whether the print page P is the last page of a copy. If it is determined that the print page P is the last page of a copy (step S217: YES), the control unit 101 finishes this processing. On the other hand, if it is determined that the print page P is not the last page of a copy (step S217: NO), the control unit 101 goes to step S218.

In step S218, the control unit 101 increments the print page (P=P+1), and returns to step S215.

Next, a specific example of determining check print pages with respect to the job shown in FIG. 6 when the third determination condition is set will be described. The check print pages are determined on the basis of the printing condition of the job as a check print target and the third determination condition by the control unit 101.

First, when "paper feed tray" is specified as a target printing condition in accordance with the setting of the third determination condition, the control unit 101 specifies a paper feed tray to be used in a job on the basis of the paper feed tray information contained in the printing condition information of the job. Accordingly, three paper feed trays of "paper feed tray FT1, paper feed tray FT2, paper feed tray FT3" are specified as the use-scheduled paper feed trays.

When specifying the paper feed tray scheduled to be used in the job, the control unit 101 specifies a first page in each paper feed tray to be used in the job. Then, the control unit 101 makes the image forming unit 600 execute the image forming processing for check print while the page specified as the first page using each paper feed tray is set as a target page.

In the job of FIG. 6, the paper feed tray FT1 is used for page 1, page 2, pages 11 to 14 and pages 16 to 20; the paper feed tray FT2 is used for pages 3 to 10 which are inserted on the basis of the first inter-sheet setting; and the paper feed tray FT3 is used for page 15 which is inserted on the basis of the second inter-sheet setting.

Figure 9A:
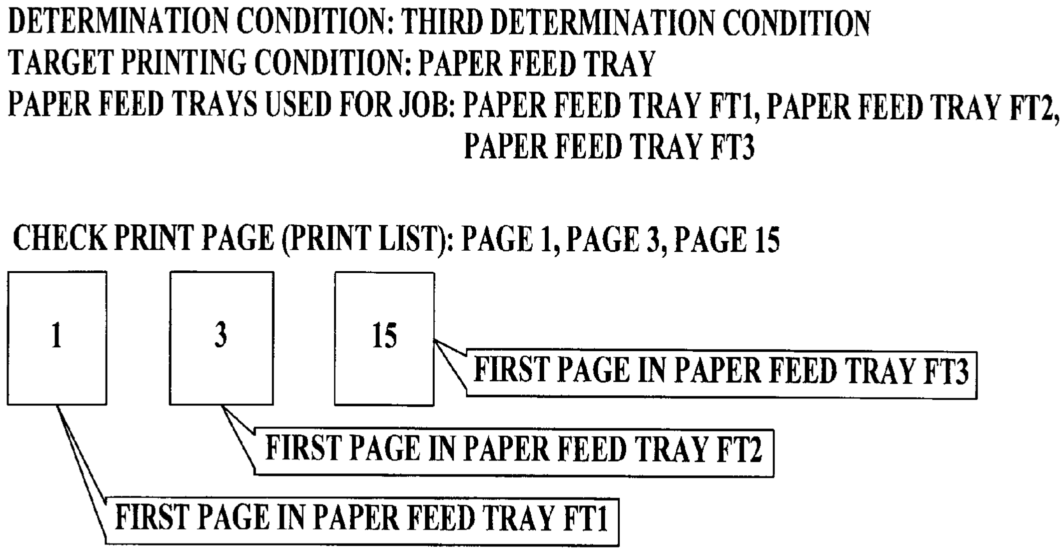
FIG. 9A is an explanatory diagram showing check print pages according to the check print processing of the job shown in FIG. 6 when the third determination condition is set.

That is, in this job, page 1 is specified as a first page using the paper feed tray FT1, page 3 is specified as a first page using the paper feed tray FT2, and page 15 is specified as a first page using the paper feed tray FT3. Accordingly, in the job of FIG. 6, page 1, page 3 and page 15 are subjected to check print as shown in FIG. 9A.

Next, a specific example of determining check print pages with respect to the job shown in FIG. 6 when the fourth determination condition is set will be described. The check print pages are determined on the basis of the printing condition of the job as a check print target and the fourth determination condition by the control unit 101.

First, when "paper type" is specified as a target printing condition in accordance with the setting of the fourth determination condition, the control unit 101 specifies a paper type to be used in a job on the basis of the paper type information (see FIG. 3) contained in the printing condition information of the job. Accordingly, two paper types of "plain paper, heavy paper" are specified as use-scheduled paper types.

When the paper types scheduled to be used in the job is specified, the control unit 101 specifies a first page using each paper type to be used in the job. Then, the control unit 101 makes the image forming unit 600 executed the image forming processing for check print while the page specified as the first page using each paper type is set as a target page.

In the job of FIG. 6, plain paper is used for page 1, page 2, pages 11 to 14, pages 16 to 20, and page 15 which is inserted on the basis of the second inter-sheet setting; and heavy paper is used for pages 3 to 10 which are inserted on the basis of the first inter-sheet setting.

Figure 9B:
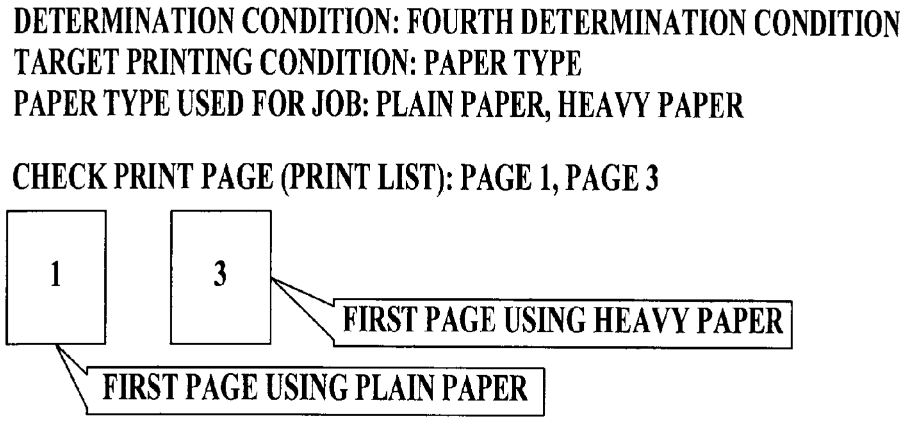
FIG. 9B is an explanatory diagram showing check print pages according to the check print processing of the job shown in FIG. 6 when the fourth determination condition is set.

That is, in this job, page 1 is specified as a first page using plain paper, and page 3 is specified as a first page using heavy paper. Accordingly, in the job of FIG. 6, page 1 and page 3 are subjected to check print as shown in FIG. 9B.

Figure 10:
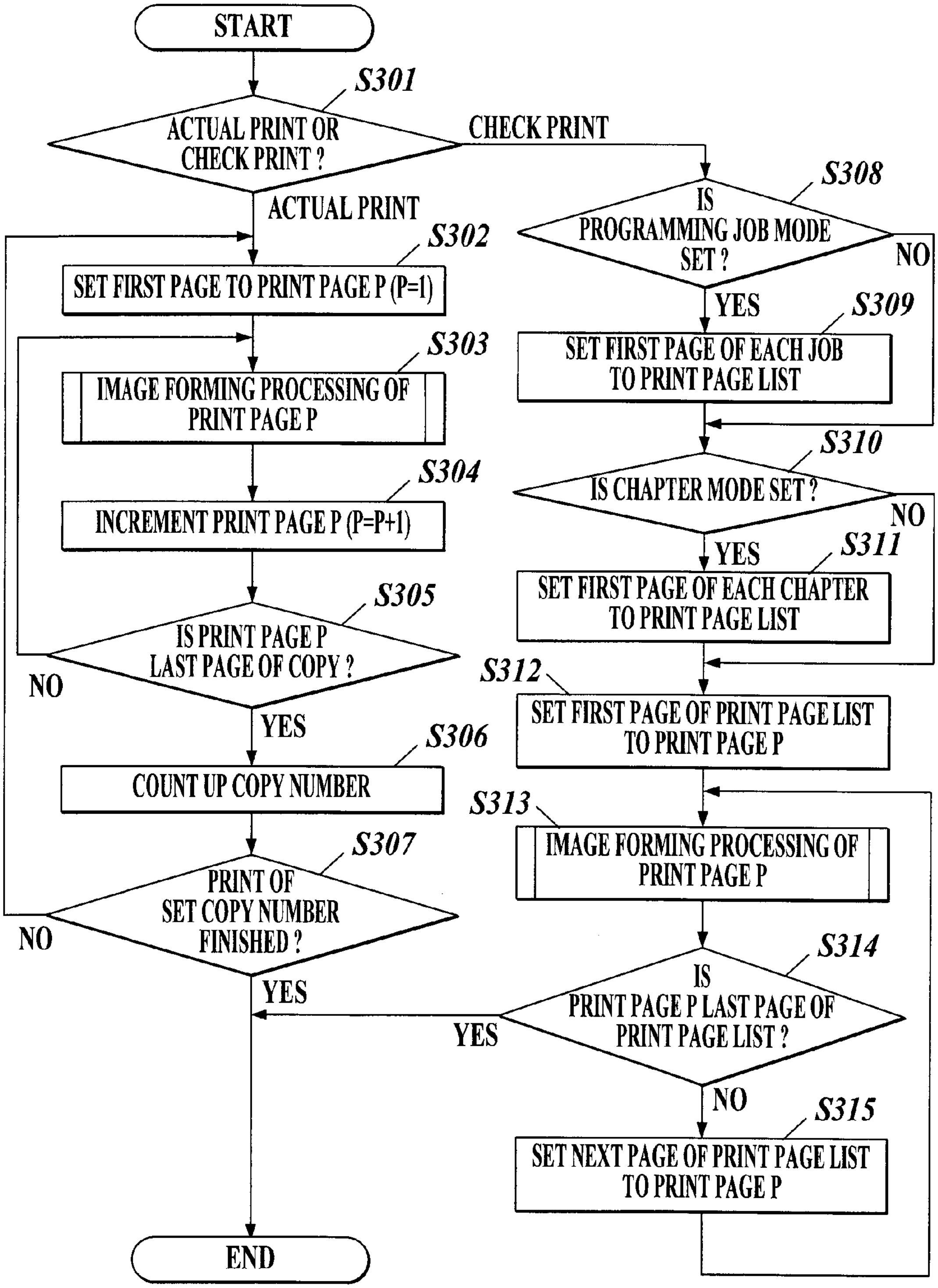
FIG. 10 shows a flowchart of check print processing executed when a fifth determination condition or a sixth determination condition is set.

Next, check print processing executed when the fifth determination condition or the sixth determination condition is set will be described with reference to the flowchart of FIG. 10.

In step S301, the control unit 101 determines on the basis of the printing condition of a job which one of the actual print mode and the check print mode the print mode corresponds to. When the print mode is determined as the actual print mode, the control unit 101 goes to step S302. On the other hand, when the print mode is determined as the check print mode, the control unit 101 goes to step S308.

In step S302, the control unit 101 sets the first page of a copy to the print page P (P=1).

In step S303, the control unit 101 makes the image forming unit 600 executed the image forming processing of the print page P.

In step S304, the control unit 101 increments the print page P (P=P+1).

In step S305, the control unit 101 determines whether the print page P is the last page of a copy. If it is determined that the print page P is the last page of a copy (step S305: YES), the control unit 101 goes to step S306. On the other hand, if it is determined that the print page P is not the last page of a copy (step S305: NO), the control unit 101 returns to step S303.

In step S306, the control unit 101 counts up the copy number.

In step S307, the control unit 101 determines whether the image forming processing of the set copy number is finished or not. If it is determined that the print of the set copy number is finished (step S307: YES), the control unit 101 finishes this processing. On the other hand, when the print of the set copy number is not finished (step S307: NO), the control unit 101 increments the copy number, and returns to the step S302.

In step S308, the control unit 101 determines on the basis of the printing condition of the job whether the programming job mode is set or not. If it is determined that the programming job mode is set (step S308: YES), the control unit 101 goes to step S309. On the other hand, if it is determined that the programming mode is not set (step S308: NO), the control unit 101 goes to step S310.

In step S309, the control unit 101 sets the first page of each job in the program job mode to the print page list.

In step S310, the control unit 101 determines on the basis of the printing condition of the job whether the chapter division mode is set or not. If it is determined that the chapter division mode is set (step S301: YES), the control unit 101 goes to step S311. If it is determined that the chapter division mode is not set (step S301: NO), the control unit 101 goes to step S312.

In step S311, the control unit 101 sets the first page of each chapter set in the chapter division mode into the print page list.

In step S312, the control unit 101 sets the first page of the print page list to the print page P.

In step S313, the control unit 101 makes the image forming unit 600 execute the image forming processing of the print page P.

In step S314, the control unit 101 determines whether the print page P is the last page of the print page list. If it is determined that the print page P is not the last page of the print page list (step S314: NO), the control unit 101 goes to step S315. On the other hand, if it is determined that the print page P is the last page of the print page list (step S314: YES), the control unit 101 finishes this processing.

In step S315, the control unit 1010 sets the next page in the print page list to the print page P, and returns to step S313.

Next, a specific example of determining check print pages when the fifth determination condition is set will be described. The check print pages are determined on the basis of the fifth determination condition and the printing condition of a job as a check print target by the control unit 101. Suppose that the check print is executed with respect to a programming job shown in FIG. 11A.

First, if the programming job mode is set, the control unit 101 specifies the first page of each job on the basis of the job printing condition. The control unit 101 causes the image forming unit 600 to execute the image forming processing for check print while the page specified as the first page of each job is set as a target page.

Figure 11A:
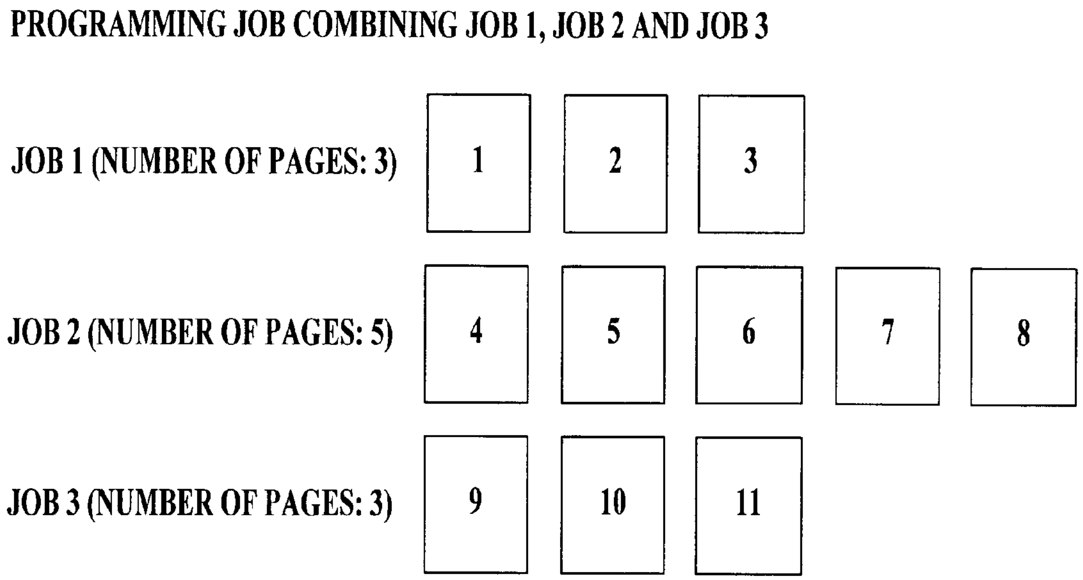
FIG. 11A shows one example of a programming job.

FIG. 11A shows a programming job combining three jobs. In this case, the processing will be described by using page numbers in the overall programming job. In the combined jobs, job 1 includes three pages (pages 1 to 3), job 2 includes five pages (pages 4 to 8), and job 3 includes three pages (pages 9 to 11).

Figure 11B:
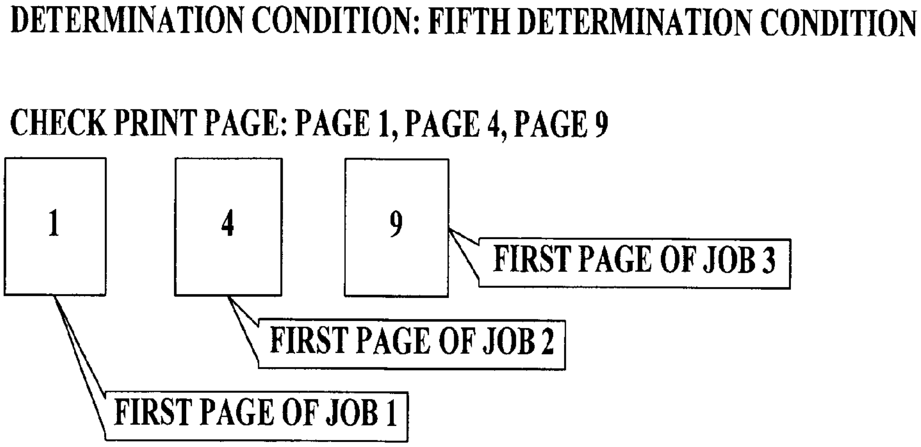
FIG. 11B an explanatory diagram showing check print pages according to the check print processing when the fifth determination condition is set.

That is, in this job, page 1 is specified as a first page of the job 1, page 4 is specified as a first page of the job 2, and page 9 is specified as a first page of the job 3. Accordingly, in the job shown in FIG. 11A, page 1, page 4, and page 9 are subjected to check print as shown in FIG. 11B.

Next, a specific example of determining check print pages when the sixth determination condition is set will be described. The check print pages are determined on the basis of the sixth determination condition and the printing condition of a job as a check print target by the control unit 101. Suppose that the check print is executed with respect to a job shown in FIG. 12A.

First, if the chapter division mode is set, the control unit 101 specifies a first page of each chapter on the basis of the job printing condition. Then, the control unit 101 causes the image forming unit 600 to execute the image forming processing for check print while the first page of each chapter is set as a target page.

Figure 12A:
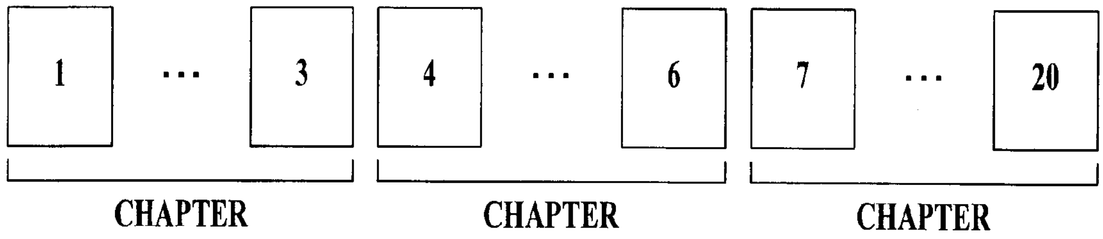
FIG. 12A shows one example of a chaptered job.

FIG. 12A shows a job which is chaptered into three chapters of a chapter from page 1, a chapter from page 4 and a chapter from page 7.

Figure 12B:
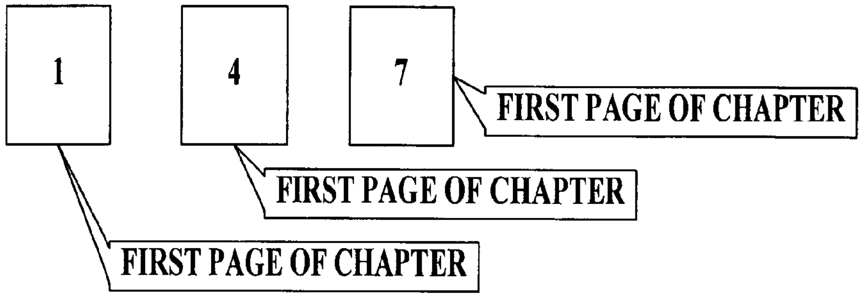
FIG. 12B an explanatory diagram showing check print pages according to the check print processing when the sixth determination condition is set.

That is, in this job, page 1, page 4 and page 7 are specified as first pages of the respective chapters. Accordingly, in the job shown in FIG. 12A, page 1, page 4 and page 7 are subjected to check print as shown in FIG. 12B.

According to the image forming apparatus 1 of this embodiment, the operation display unit 500 (setting unit) for setting the printing condition of a job, and the image forming unit 600 for executing the image forming processing according to the printing condition set by the operation display unit 500 (setting unit) are provided. Furthermore, the condition concerning execution or non-execution of check print is contained in the printing condition. When the printing condition set by the operation display unit 500 contains execution of check print, the control unit 101 determines check print pages on the basis of the printing condition and a predetermined determination condition, and controls the image forming unit 600 to execute the image forming processing for check print on only the determined check print pages.

Accordingly, when the image forming processing for check print is executed, it is unnecessary for a user to specify check print pages, and thus the operation load imposed on users can be reduced. Furthermore, the check print is executed on only the pages which are determined on the basis of the printing condition and the predetermined determination condition, so that the check print can be executed on only pages which are matched with each purpose. Therefore, there can be provided an image forming apparatus that is convenience to use for users and excellent in working efficiency.

If the printing condition indicates that a plurality of paper feed trays are used, the first determination condition indicates that page 1 is defined as a first page, a page when all of the plurality of paper feed trays are used is defined as a last page, and all pages from the first page to the last page are determined to be subjected to the check print. Accordingly, if use of a plurality of paper feed trays is contained in the printing condition, page 1 is set as the first page, a page when all the plurality of paper feed trays contained in the printing condition are used is set as the last page, and only the pages from the first page to the last page are subjected to the check print. Therefore, usability for users is enhanced.

If the printing condition indicates that a plurality of paper types are used, the second determination condition indicates that page 1 is defined as a first page, a page when all of the plurality of paper types are used is defined as a last page, and all pages from the first page to the last page are determined to be subjected to the check print. Accordingly, if use of a plurality of paper types is contained in the printing condition, page 1 is set as the first page, a page when all the plurality of paper types contained in the printing condition are used is set as the last page, and only the pages from the first page to the last page are subjected to the check print. Therefore, the usability for users is enhanced.

If the printing condition indicates that a plurality of paper feed trays are used, the third determination condition indicates that first pages in the respective paper feed trays are determined to be subjected to the check print. Accordingly, if use of a plurality of paper feed trays is used in the printing condition, only the first page in each paper feed tray is subjected to the check print. Therefore, the usability for users is enhanced.

If the printing condition indicates that a plurality of paper types are used, the fourth determination condition indicates that first pages in the respective paper types are determined to be subjected to the check print. Accordingly, if use of a plurality of paper types is contained in the printing condition, only the first page using each paper type is subjected to the check print. Therefore, the usability for users is enhanced.

If the printing condition contains a programming job mode, the fifth determination condition indicates that first pages in the respective combined jobs are determined to be subjected to the check print. Accordingly, if the programming job mode is contained in the printing condition, only the first page of each job is subjected to the check print. Therefore, the usability for users is enhanced.

If the printing condition contains a chapter division mode, the sixth determination condition indicates that first pages in the respective chapters are determined to be subjected to the check print. Accordingly, if the chapter division mode is contained in the printing condition, only the first page of each chapter is subjected to the check print. Therefore, the usability for users is enhanced.

In this embodiment, a user can freely set any condition of the first to sixth determination conditions, and thus only pages which are matched with user's intention can be subjected to check print.

The present invention is not limited to the above embodiment, and various improvements and alteration of design can be performed without departing from the subject matter of the present invention.

For example, in the above embodiment, the third determination condition determines the first page in each paper feed tray as a check print page when use of plural sheet trays is contained in the printing condition. However, any page of pages using each paper feed tray can be set as a check print page. Furthermore, a user can freely set a more detailed condition (for example, what page should be subjected to check print, a printing condition of a check print page, etc.) for determining a check print page out of the pages using each paper feed tray.

Furthermore, in the above embodiment, the fourth determination condition determines the first page using each paper type as a check print page when use of plural paper types is contained in the printing condition. However, any page of the pages using each paper type can be determined as a check print page. Furthermore, a more detailed condition (for example, what page should be subjected to check print, a printing condition of a check print page, etc.) for determining a check print page can be freely set by a user.

Still furthermore, in the above embodiment, only one of the first to sixth determination conditions is set. However, these determination conditions may be freely combined and set unless as they do not compete against one another.

Still furthermore, in the above embodiment, the presence or absence of the setting of the first to sixth determination conditions is selected by a user. However, at least one of the first to sixth determination conditions may be preset at the machine side and check print is executed on the basis of the preset determination condition.

According to one aspect of the preferred embodiment of the present invention, there is provided an image forming apparatus, including: a setting unit to set a printing condition of a job, the printing condition containing a condition indicating whether check print is to be executed or not; an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages.

According to the image forming apparatus of this invention, pages for the check print are determined as the check print pages on the basis of the printing condition and the predetermined determination condition, and the check print is executed with respect to only the pages determined as the check print pages. Therefore, the pages based on the printing condition are printed for the check print. Accordingly, the image forming apparatus that can reduce the operation load on users and also is convenient to use for the users can be provided.

Preferably, the printing condition contains a condition indicating one or a plurality of paper feed trays to be used, and if the printing condition indicates that the plurality of paper feed trays are used, the determination condition indicates that page one is defined as a first page, a page when all of the plurality of paper feed trays are used is defined as a last page, and all pages from the first page to the last page are determined to be subjected to the check print.

If the printing condition contains use of a plurality of paper feed trays, page one is set as a first page, a page when all the plurality of paper feed trays contained in the printing condition are used is set as a last page, and all the pages from the first page to the last page are subjected to the check print. Therefore, the usability for users is enhanced.

Preferably, the printing condition contains a condition indicating one or a plurality of paper types of sheets to be used, and if the printing condition indicates that the plurality of paper types are used, the determination condition indicates that page one is defined as a first page, a page when all of the plurality of paper types are used is defined as a last page, and all pages from the first page to the last page are determined to be subjected to the check print.

If the printing condition contains use of a plurality of paper types, page one is set as a first page, a page when all the plurality of paper types contained in the printing condition are used is set as a last page, and all the pages from the first page to the last page are subjected to the check print. Therefore, the usability for users is enhanced.

Preferably, the printing condition contains a condition indicating one or a plurality of paper feed trays to be used, and if the printing condition indicates that the plurality of paper feed trays are used, the determination condition indicates that first pages in the respective paper feed trays are determined to be subjected to the check print.

If the printing condition contains use of a plurality of paper feed trays, only the first pages in the respective paper feed trays are subjected to the check print. Therefore, the usability for users is enhanced.

Preferably, the printing condition contains a condition indicating one or a plurality of paper types of sheets to be used, and if the printing condition indicates that the plurality of paper types are used, the determination condition indicates that first pages in the respective paper types are determined to be subjected to the check print.

If the printing condition contains use of a plurality of paper types, only the first pages in the respective paper types are subjected to the check print. Therefore, the usability for users is enhanced.

Preferably, the printing condition contains a condition indicating presence or absence of a programming job mode for combining a plurality of jobs to execute the jobs continuously, and if the printing condition contains the programming job mode, the determination condition indicates that first pages in the respective combined jobs are determined to be subjected to the check print.

If the printing condition contains a programming job mode, only the first page of each job is subjected to the check print. Therefore, the usability for users is enhanced.

Preferably, the printing condition contains a condition indicating presence or absence of a chapter division mode for diving into a plurality of chapters, and if the printing condition contains the chapter division mode, the determination condition indicates that first pages in the respective chapters are determined to be subjected to the check print.

If the printing condition contains a chapter division mode, only the first page of each chapter is subjected to the check print. Therefore, the usability for users is enhanced.

The entire disclosure of Japanese Patent Application No. 2008-307115 filed on Dec. 2, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating one or a plurality of paper feed trays to be used, and if the printing condition indicates that the plurality of paper feed trays are used, the determination condition indicates that page one is defined as a first page, a page when all of the plurality of paper feed trays are used is defined as a last page, and all pages from the first page to the last page are determined to be subjected to the check print.

2. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating one or a plurality of paper types of sheets to be used, and if the printing condition indicates that the plurality of paper types are used, the determination condition indicates that page one is defined as a first page, a page when all of the plurality of paper types are used is defined as a last page, and all pages from the first page to the last page are determined to be subjected to the check print.

3. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating one or a plurality of paper feed trays to be used, and if the printing condition indicates that the plurality of paper feed trays are used, the determination condition indicates that first pages in the respective paper feed trays are determined to be subjected to the check print.

4. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating one or a plurality of paper types of sheets to be used, and if the printing condition indicates that the plurality of paper types are used, the determination condition indicates that first pages in the respective paper types are determined to be subjected to the check print.

5. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating presence or absence of a programming job mode for combining a plurality of jobs to execute the jobs continuously, and if the printing condition contains the programming job mode, the determination condition indicates that first pages in the respective combined jobs are determined to be subjected to the check print.

6. An image forming apparatus, comprising:

a setting unit to set a printing condition of a job, the printing condition containing a condition indicating whether check print is to be executed or not;

an image forming unit to execute image forming processing in accordance with the printing condition set by the setting unit; and a control unit to determine one or more pages to be subjected to the check print based on the printing condition and a predetermined determination condition if the printing condition set by the setting unit indicates that the check print is to be executed, and to cause the image forming unit to execute the image forming processing for the check print with respect to the determined one or more pages, wherein the printing condition contains a condition indicating presence or absence of a chapter division mode for diving into a plurality of chapters, and if the printing condition contains the chapter division mode, the determination condition indicates that first pages in the respective chapters are determined to be subjected to the check print.

* * * * *